O. P. HUISH & O. E. McCLELLAN.
BEET TOPPING KNIFE.
APPLICATION FILED FEB. 8, 1916.
1,248,330.
Patented Nov. 27, 1917.
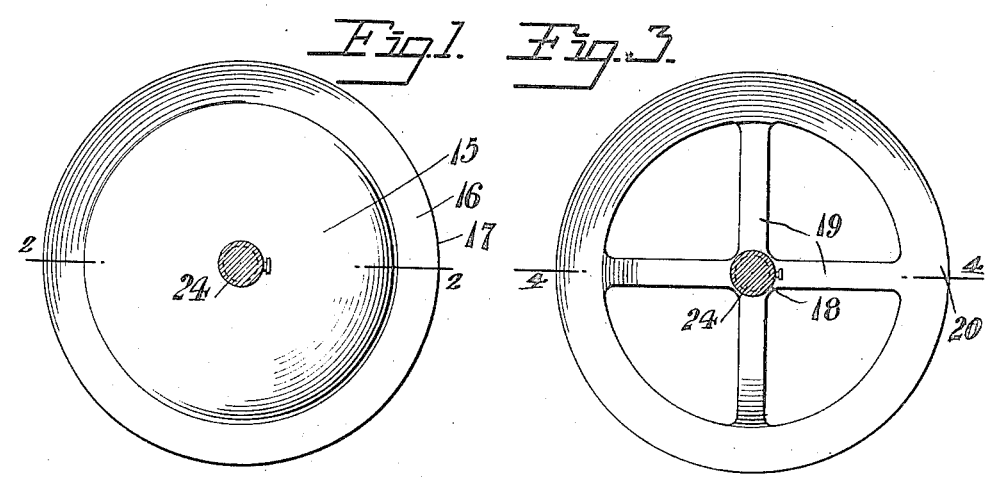
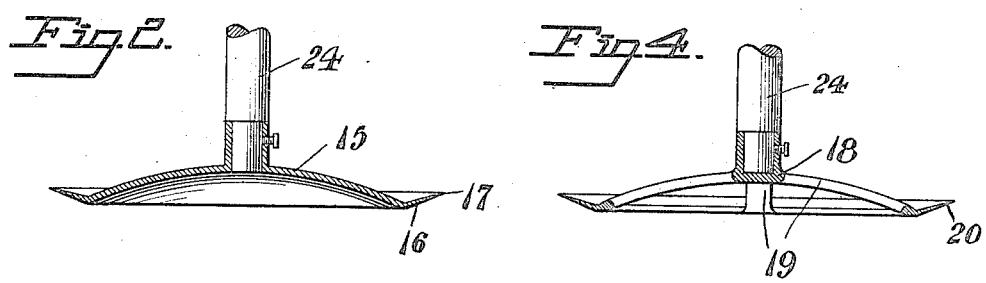
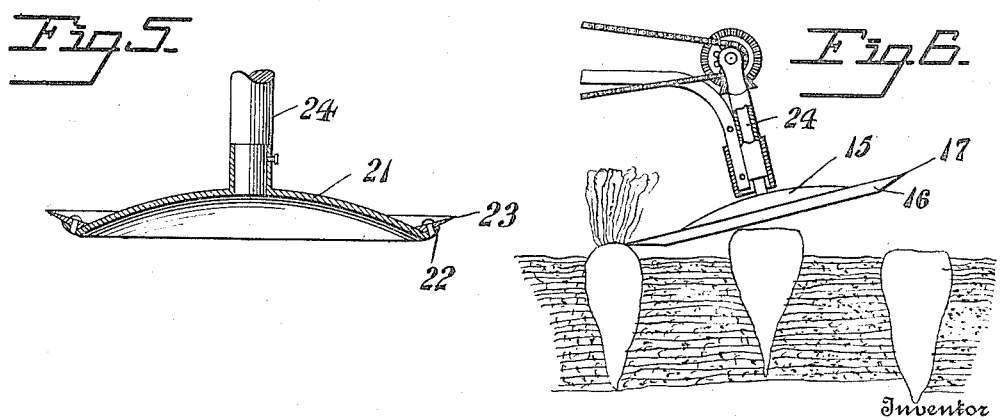
Witnesses
John D. Spalding
Inventor
O. P. Huish
O. E. McClellan
By Victor J. Evans
Attorney

UNITED STATES PATENT OFFICE.

ORSON P. HUISH AND ORLA E. McCLELLAN, OF PAYSON, UTAH.

BEET-TOPPING KNIFE.

1,248,330.   Specification of Letters Patent.   Patented Nov. 27, 1917.

Application filed February 8, 1916.   Serial No. 76,985.

*To all whom it may concern:*

Be it known that we, ORSON P. HUISH and ORLA E. McCLELLAN, citizens of the United States, residing at Payson, in the county of Utah and State of Utah, have invented new and useful Improvements in Beet-Topping Knives, of which the following is a specification.

This invention relates to beet toppers, and it has for its object to produce a simple and improved rotary topping knife which may be advantageously used in connection with beet harvesters or topping machines of various types and constructions.

A further object of the invention is to produce a rotary topping knife which will readily adapt itself to beets of various sizes and protruding variously above the ground.

A further object of the invention is to produce a rotary topping knife having a cutting portion which is disposed obliquely with respect to the axis of the cutter carrying shaft, the latter being mounted on an inclined shaft so that the top engaging portion of the cutter will be maintained in an approximately horizontal position, while the body of the cutting member is tilted upwardly so that it will not be interfered with by beet roots that protrude above the root that is being engaged by the cutting member.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Figure 1 is a plan view showing a simple and preferred form of the improved topping knife.

Fig. 2 is a sectional view taken on the line 2—2 in Fig. 1.

Fig. 3 is a plan view illustrating a modified form of the invention.

Fig. 4 is a sectional view taken on the line 4—4 in Fig. 3.

Fig. 5 is a sectional detail view illustrating another modification.

Fig. 6 is a detail view in side elevation showing the improved topping knife mounted for operation.

Corresponding parts in the several figures are denoted by like characters of reference.

The improved topping knife, as illustrated in Figs. 1 and 2, consists of a circular disk comprising a concavo-convex center portion or body portion 15 and a slightly upturned obliquely disposed rim portion 16, the latter being sharpened to produce a cutting edge 17, the body portion 15 and the rim 16 being preferably formed by stamping or otherwise from a single plate of steel.

By the construction shown in Figs. 3 and 4, the central or body portion of the device is composed of a hub 18 having upwardly arched spokes 19 with which an annular upturned and obliquely disposed cutting member 20 is connected, said cutting member being disposed obliquely to the axis of the hub.

By the construction shown in Fig. 5, the body or center portion 21 is formed with a circumferential upturned and obliquely disposed flange 22 on which an annular knife or cutting member 23 is riveted or otherwise secured, said cutting member being disposed obliquely with respect to the axis of the body member. In each of the forms of the device as herein described, it will be particularly observed that the central or body portion of the device is convex on its upper side and concave on its under side, the apex of the arc presented by a cross section of the device lying in a plane materially above the edge of the cutting member. It follows that when the device is tilted to an operative position, as seen in Fig. 6, the concave bottom portion of the device will afford ample room for the beet roots that have not already been topped irrespective of how far they may project above the ground. When any of the forms of the device herein described is mounted on an inclined shaft, as seen at 24 in Fig. 6 of the drawing, a portion of the cutter will be supported in an approximately horizontal position for engagement with the beets, the tops of which will be removed by the action of the cutting member which is driven in any well known and conventional manner. The body portion of the cutting member will be tilted upwardly and rearwardly so as to admit of the passage thereunder of beets that protrude above the ground to a greater extent than the beet root the top of which is in process of being removed, as will be clearly seen by reference to Fig. 6 of the drawing.

The construction of the topping knife may obviously be modified in many respects without departing from the spirit or scope of the invention and of the appended claims.

Having thus described the invention, what is claimed as new is:—

A rotary beet topping knife having a body portion convex on its upper side and concave on its under side and provided at the circumference thereof with an obliquely disposed cutting member which is upturned with respect to the body portion and the cutting edge of which lies in a plane materially lower than the apex of the convex or concave body portion.

In testimony whereof we affix our signatures in presence of two witnesses.

ORSON P. HUISH.
ORLA E. McCLELLAN.

Witnesses:
JOHN T. LANT,
JACOB COLEMAN.

Copies of this patent may be obtained for five cents each, by addressing the "Commissioner of Patents, Washington, D. C."